(12) United States Patent
Valerio

(10) Patent No.: US 10,894,258 B2
(45) Date of Patent: Jan. 19, 2021

(54) SYSTEM AND METHOD FOR RECOVERING DESIRED MATERIALS AND PRODUCING CLEAN AGGREGATE FROM INCINERATOR ASH

(71) Applicant: TAV HOLDINGS, INC., Atlanta, GA (US)

(72) Inventor: Thomas Valerio, Atlanta, GA (US)

( * ) Notice: Subject to any disclaimer, the term of this patent is extended or adjusted under 35 U.S.C. 154(b) by 151 days.

(21) Appl. No.: 15/747,725

(22) PCT Filed: Jul. 25, 2016

(86) PCT No.: PCT/US2016/043790
§ 371 (c)(1),
(2) Date: Jan. 25, 2018

(87) PCT Pub. No.: WO2017/019579
PCT Pub. Date: Feb. 2, 2017

(65) Prior Publication Data
US 2018/0214890 A1    Aug. 2, 2018

Related U.S. Application Data

(60) Provisional application No. 62/196,976, filed on Jul. 25, 2015.

(51) Int. Cl.
*B03B 9/04* (2006.01)
*C22B 7/02* (2006.01)
(Continued)

(52) U.S. Cl.
CPC ............ *B03B 9/04* (2013.01); *B02C 23/20* (2013.01); *B03B 5/623* (2013.01); *C22B 3/22* (2013.01);
(Continued)

(58) Field of Classification Search
CPC .. B03B 5/623; B03B 7/00; B03B 9/04; B03B 13/04; B02C 23/10; B02C 23/14;
(Continued)

(56) References Cited

U.S. PATENT DOCUMENTS

| | | | | |
|---|---|---|---|---|
| 4,121,945 A | * | 10/1978 | Hurst | B03B 9/04 |
| | | | | 106/405 |
| 4,416,768 A | * | 11/1983 | Nosseir | B03B 9/00 |
| | | | | 209/3 |

(Continued)

FOREIGN PATENT DOCUMENTS

| | | |
|---|---|---|
| DE | 4123277 C1 | 5/1993 |
| WO | 0003807 A1 | 1/2000 |

(Continued)

OTHER PUBLICATIONS

International Search Report, dated Oct. 13, 2016, PCT/US16/43790.

*Primary Examiner* — Joseph C Rodriguez
(74) *Attorney, Agent, or Firm* — Lewis Brisbois Bisgaard & Smith LLP

(57) ABSTRACT

Devices, systems, and methods for separating incinerator combined ash are described. The devices, systems, and methods include a fines process that utilizes water or other liquid in the separation of portions of the incinerator combined ash.

17 Claims, 3 Drawing Sheets

(51) Int. Cl.
  *F23J 1/00* (2006.01)
  *B02C 23/20* (2006.01)
  *B03B 5/62* (2006.01)
  *C22B 3/22* (2006.01)
  *C22B 15/00* (2006.01)

(52) U.S. Cl.
  CPC ............ *C22B 7/02* (2013.01); *C22B 15/0086* (2013.01); *F23J 1/00* (2013.01); *F23J 2900/01001* (2013.01); *F23J 2900/01003* (2013.01); *Y02P 10/212* (2015.11)

(58) Field of Classification Search
  CPC ....... B02C 23/20; F23J 1/00; F23J 1/08; F23J 2900/01001; F23J 2900/01003; C22B 15/0086; C22B 7/02; C22B 3/22; B07B 2230/01; B03C 1/30; B04C 7/00
  See application file for complete search history.

(56) References Cited

U.S. PATENT DOCUMENTS

| | | | | |
|---|---|---|---|---|
| 5,207,742 A * | 5/1993 | Scutt | ................. | B03B 5/24 209/455 |
| 5,356,082 A * | 10/1994 | Prinz | ................. | B03B 9/04 241/24.13 |
| 6,048,382 A * | 4/2000 | Greenwalt | .......... | C21B 13/0086 75/436 |
| 8,360,347 B2 * | 1/2013 | Valerio | .................... | B09B 3/00 209/133 |
| 8,673,208 B2 * | 3/2014 | Bueno Colina | ..... | C21B 13/0073 209/13 |
| 9,216,419 B2 * | 12/2015 | Evers | ................. | B03B 9/04 |
| 9,539,581 B2 * | 1/2017 | Pickens | ................. | B03B 9/04 |
| 9,573,139 B2 * | 2/2017 | Vandemierden | ......... | B03B 9/04 |
| 10,213,790 B2 * | 2/2019 | Klinkhammer | ............ | F23J 1/00 |
| 2004/0159593 A1 | 8/2004 | Allen et al. | | |
| 2006/0005749 A1 | 1/2006 | Shih et al. | | |
| 2011/0100260 A1 | 5/2011 | Curzio | | |
| 2013/0181075 A1 | 7/2013 | Pickens et al. | | |
| 2015/0136662 A1 | 5/2015 | Valerio | | |
| 2018/0214890 A1 * | 8/2018 | Valerio | ................. | B03B 9/04 |
| 2018/0214891 A1 * | 8/2018 | Valerio | ................. | B03B 9/04 |
| 2019/0176163 A1 * | 6/2019 | Valerio | ................. | B03C 1/23 |

FOREIGN PATENT DOCUMENTS

| | | |
|---|---|---|
| WO | 2012176160 A1 | 12/2012 |
| WO | 2014056065 A1 | 4/2014 |

\* cited by examiner

SYSTEM AND METHOD FOR RECOVERING DESIRED MATERIALS AND PRODUCING CLEAN AGGREGATE FROM INCINERATOR ASH

CROSS-REFERENCE TO RELATED APPLICATIONS

This application claims priority to and the benefit of U.S. Patent Application No. 62/196,976, filed Jul. 25, 2015, which is incorporated herein by reference in its entirety.

TECHNICAL FIELD

The present disclosure generally relates to separation techniques for fines (less than 2 mm), and more particularly to recovering materials (metals, high value metals, clean sand/aggregate, and non-hazardous cake) from incinerator ash.

BACKGROUND

Millions of tons of municipal solid waste are produced every year. Waste management and utilization strategies are major concerns in many countries. Incineration is a common technique for treating waste, as it can reduce waste mass by 80% and volume by up to 90% and can allow recovery of energy from waste to generate electricity.

To use the incinerator waste and reduce the environmental impact, treatment methods have been introduced and the waste has been classified and separated to promote recovery. There is always a need for improved methods for separating and classifying incinerator waste, including incinerator combined ash.

SUMMARY

This disclosure generally provides systems and methods for separating incinerator combined ash into desired materials. According to various embodiments, the devices, systems, and methods include a fines process that utilizes water or other liquid in the separation of portions of the incinerator combined ash.

This disclosure generally provides devices, systems, and methods for separating incinerator combined ash into desired materials. According to various embodiments, the devices, systems, and methods include a fines process that utilizes water or other liquid in the separation of portions of the incinerator combined ash.

One method for separating combined incinerator ash using water has the steps of (a) sizing the incinerator combined ash using at least one 2-stage screen to recover a first material less than about 2 mm; (b) wet screening the first material with a screen, using a water slurry, to recover a first group of the ash in the range of about 0.5 mm and about 2 mm and a second group of ash less than about 0.5 mm; (d) processing the first group by (i) separating the first group using a first rising current separator operating at about 2.0 SG into a first heavy fraction and a first light fraction; (ii) separating the first heavy fraction using a second rising current separator operating at about 3.2 SG to separate a second heavy fraction portion and a second light fraction, wherein the second light fraction contains sand; (iii) separating the first light fraction using a third rising current separator or spiral separator operating at about 2.0 SG into a third heavy fraction and third light fraction, wherein the third heavy fraction is conveyed to the second rising current separator for separation; (iv) magnetically separating the second heavy fraction to recover ferromagnetic metals and paramagnetic metals (v) centrifuging at 3.2 SG the second heavy fraction to recover precious metals and heavy metal concentrate; (e) processing the second group by (i) separating the second group using a gravity separator (e.g., a hydrocyclone) into a first heavy material and second light material, wherein the second light material is removed from the system; (ii) de-sliming the first heavy material and then using a first oxygen encapsulated separator to recover a precious metals concentrate and a tail portion containing a copper concentrate, (iii) processing the tail portion of the first oxygen encapsulated separator through a second oxygen encapsulated separator to recover the copper concentrate. The copper concentrate is a smelter grade copper product.

Another aspect includes a system for separating incinerator ash materials having a size reducer, a 2-stage screen that allows incinerator ash materials of about 2 millimeters (mm) or less to pass through a first screen and allows materials about 50 mm or less to pass through a second screen, and a wet screen with water, which allows "unders" and "overs" to pass therethrough. The system includes a hydrocyclone operatively connected to a first oxygen encapsulated separator and a second oxygen encapsulated separator. The system also includes a first rising current separator operating at about 2.0 SG operatively connected to a second rising current separator operating at about 3.2 SG and a third rising current separator operating at about 2.0 SG, a magnetic separator capable of recovering ferromagnetic metals or paramagnetic metals and operatively connected to the second rising current separator, and a centrifuge separator at 3.2 SG operatively connected to the magnetic separator.

BRIEF DESCRIPTION OF THE DRAWINGS

The present disclosure is illustrated in the figures of the accompanying drawings which are meant to be illustrative and not limiting, in which like references are intended to refer to like or corresponding parts, and in which.

DETAILED DESCRIPTION

Generally, the present disclosure relates to systems and methods for obtaining desired materials from incinerator ash, including incinerator combined ash. Water or other liquid is used to separate portions of the incinerator ash.

Figure 1:
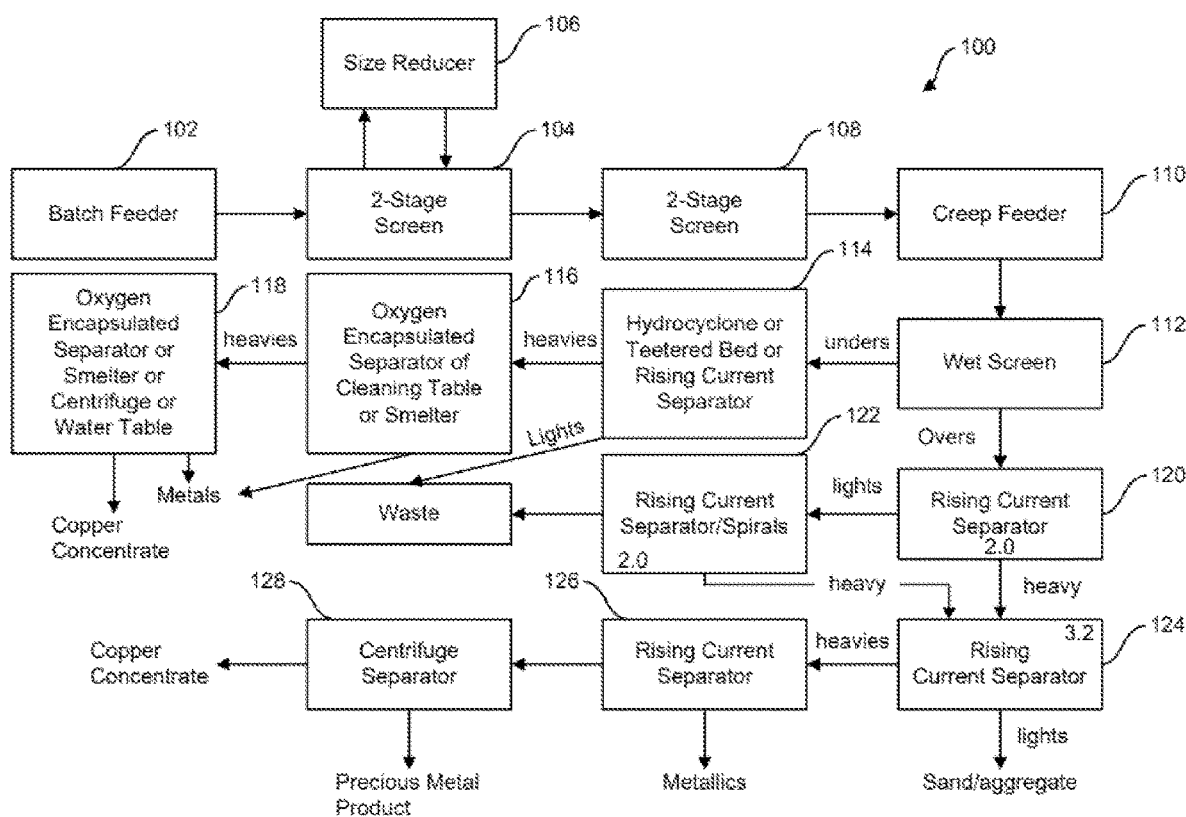
FIG. 1 illustrates an exemplary equipment layout diagram for an incinerator combined ash processing system in accordance to the present disclosure.

FIG. 1 illustrates an exemplary system 100 for separating incinerator combined ash to obtain desired materials. Configuration of the components of the system 100 herein results in the system 100 producing a sand aggregate also known as mason sand or fine sand, precious metals, and non-ferrous metals.

A batch feeder 102 dispenses combined incinerator ash or other similar waste containing various sizes of materials into a 2-stage screen 104. The 2-stage screen 104 has a screen that allows materials about 100 millimeters (mm) or less to pass through and a screen that allows materials about 35 or 50 mm or less to pass through. Materials greater than about 2 mm are removed from the system 100 for further manual and/or automatic processing, such as coarse processing, for example. Materials having a size of greater than about 2 mm can be sent to a size reducer 106, which reduces the smaller sized materials and ultimately to materials less than about 2 mm.

The size reducer 106 may be a ball mill, crusher, shredder, or like apparatus capable of reducing the size of the materials sent to the size reducer 106. Upon the materials being reduced in size, the materials may be sent back to the 2-stage screen 104 for further separation. Both crushing and grinding lead to size reduction of the material or to "comminution". Ball milling can be used to prepare powdered materials, e.g., materials greater than 35 or 50 mesh (e.g., about 100 mesh or 80 mesh).

Optionally, after size reduction or before size reduction, the materials can be processed with an eddy current and/or high frequency eddy current to separate out non-ferrous metals, particularly aluminum. In some situations, the materials may be dried to about 10% moisture or less, e.g., by storage, squeezing, thermal processing, or other suitable methods.

Materials about 2 mm and smaller are passed (optionally) from the 2-stage screen 108 to a creep feeder 110 to undergo further processing, such as fines processing. Creep feeders are well known in the art and, as such, will not be described in further detail herein. The creep feeder 110 transfers materials to a wet screen 112.

Materials about 0.5 mm or smaller can be sent to a hydrocyclone, a teetered bed, or a rising current separator (collectively illustrated as 114). A hydrocyclone (sometimes referred to as a cyclone) separates materials in a liquid suspension based on the ratio of their centripetal force to fluid resistance. For dense materials (separation based on density) and coarse materials (separation based on size), the ratio of centripetal force to fluid resistance is high. To the contrary, light and fine materials have a low ratio. An overs/light portion produced by the hydrocyclone, teetered bed, or rising current separator 114 is sent to a clarifier and/or thickener where the overs/light portion becomes a cake and is removed from the system (the cake may have commercial value). An unders/heavy portion is sent to an oxygen encapsulated separator (where the materials are separated into a precious concentrate and a tails portion), and the concentrate can be sent to a cleaning table for further concentration, and that recovered concentration can be sent to a smelter or refinery (collectively illustrated as 116). This can be accomplished through polar separation or oxygen separation or interfacial separation. The precious concentrate, which may contain, for example, silver, gold, and platinum is removed from the system 100 (potentially for further processing). The tails portion is transferred to an oxygen encapsulated separator, a smelter, a centrifuge, and/or a water table (collectively illustrated as 118), which separate the tails portion into a concentrate, such as a copper concentrate, and ash. The concentrate and ash are removed from the system 100 and one or both of the concentrate and ash may undergo further processing. The copper concentrate is a final product.

As shown in FIG. 1, materials about 0.5 mm and larger can be sent from the wet screen 112 to a rising current separator 120. Rising current separators involves separating metals from non-metals. The rising current separator 120 may operate at or about 2.0 specific gravity ("SG"). Materials having an SG of about 2.0 or less are sent to another rising current separator/spirals 122, which also operates at or about 2.0 specific gravity, for further processing. Materials having an SG about 2.0 or less (i.e., ash) are removed for the system 100 at the rising current separator/spirals 122. Spiral separators are devices to separate solid components in a slurry, based upon a combination of the solid particle density as well as the particle's hydrodynamic properties (e.g. drag). A spiral separator can have a helical conduit with a semi-circular cross-section. Materials having an SG about 2.0 and greater (i.e., concentrate) are sent from both the rising current separators 120, 122 to a rising current separator 124 operating at or about 3.2 SG.

The rising current separator 124 separates the materials having an SG about or less than 3.2 (i.e., sand, which is removed from the system 100) from materials having an SG about or greater than 3.2 (i.e., heavies)). The heavies are sent to a magnetic separator 126. Magnetic separators 126 include low intensity and high intensity separators—the low intensity separators can be used to separate ferromagnetic materials and the high intensity separators can be used to separator paramagnetic components.

The materials can be subsequently sent to a centrifuge separator 128. The centrifuge separator 128 may operate at or about 3.2 SG. The centrifuge separator 132 separates the heavies into a precious metal concentrate portion and a heavy metals portion, both of which are removed from the system 100.

Figure 2:
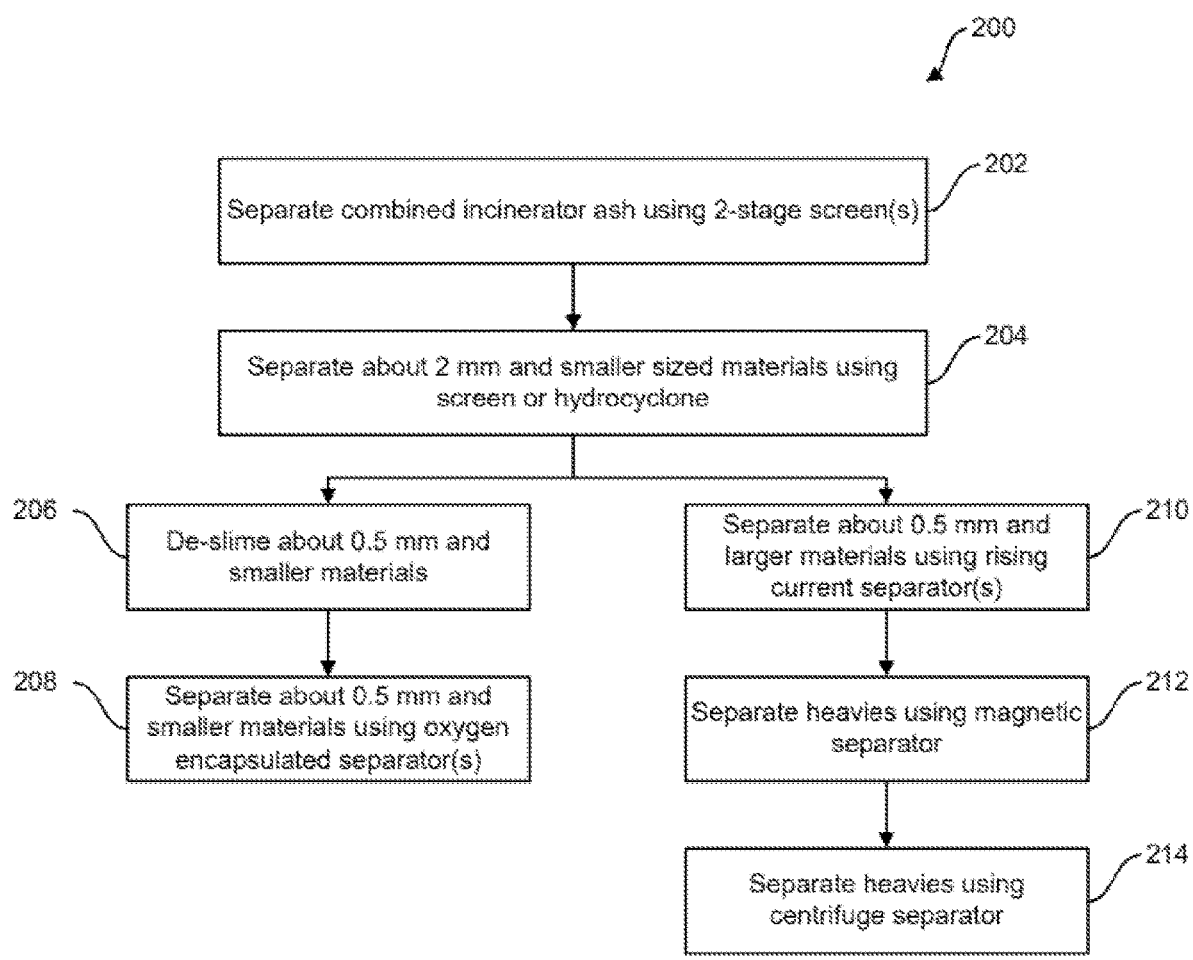
FIG. 2 is a process flow diagram illustrating a method of incinerator combined ash processing according to the present disclosure.

Referring to FIG. 2, a method 200 for processing incinerator combined ash is described. At block 202 incinerator combined ash is separated using at least one 2-stage screen. Potential screen hole sizes include about 100 mm, about 35 mm, about 6 mm, and about 2 mm. Upon completion of separation of the incinerator combined ash, material sizes remaining in the system are preferably about 2 mm or smaller. In an example, a single 2-stage screen with at least one screen having holes about 2 mm in size is implemented. In other examples, multiple 2-stage screens are used, with at least one of the screens of the 2-stage screens having about 2 mm holes.

At block 204 the about 2 mm and smaller materials are separated using a screen or hydrocyclone. Transfer of the materials from the 2-stage screen(s) to the screen/hydrocyclone may include the use of a creep feeder. The screen may have holes about 0.5 mm in size. At block 206 materials about 0.5 mm and smaller in size are de-slimed. At block 208 the about 0.5 mm and smaller materials are separated using at least one oxygen encapsulated separator. The oxygen encapsulated separator(s) produce a precious concentrate, a copper concentrate, and ash.

At block 210 at least one rising current separator is used to separate materials about 0.5 mm and larger. The rising current separator(s) may utilized spirals, as known in the art. Moreover, the rising current separator(s) may operate about at 2.0 SG and/or 3.2 SG. Compositions produced by the rising current separator(s) include ash (including materials having about 2.0 SG or less), sand (including materials having about 3.2 SG or less), and heavies (including materials having about 3.2 SG or greater). At block 212 the heavies are separated using a magnetic separator and at block 214 the magnetically separated heavies are further separated using a centrifuge separator. The centrifuge separator may operate at about 3.2 SG. The centrifuge separator produces a precious concentrate and a heavy metals portion.

In some embodiments, rougher and cleaner processes can be used to improve efficiency and purity of concentrations of desired materials. For example, there may be a rough process followed by a cleaner process.

In some embodiments, the polar separation or oxygen encapsulated separation or interfacial separation may require certain chemicals to facilitate the process. The chemical reagents include, but are not limited to, dithiophosphate, xanthate, or combinations thereof. The pH of the solution should be considered when using such reagents.

Figure 3:
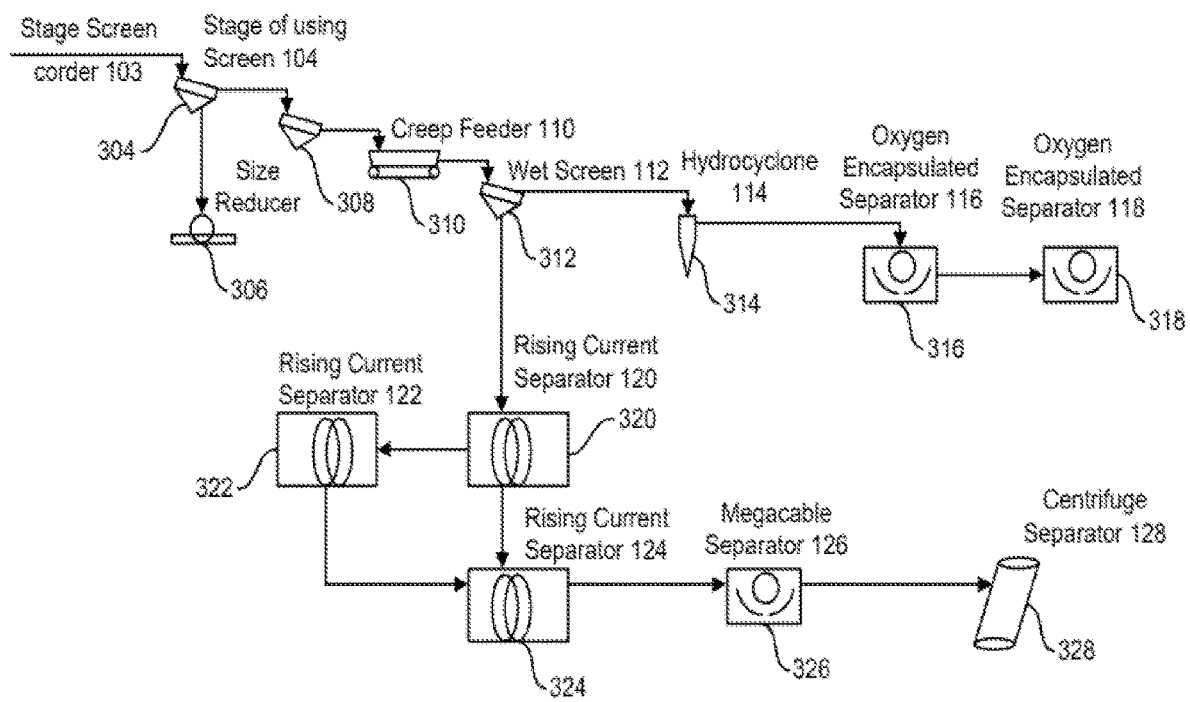
FIG. 3 illustrates an example equipment layout diagram of a system for processing fines.

FIG. 3 shows an exemplary system 300 for separating incinerator ash materials having a size reducer 306, a 2-stage screen 308 that allows incinerator ash materials of about 2 millimeters (mm) or less to pass through a first screen and allows materials about 50 mm or less to pass through to a second screen 308, a wet screen 312 with water. The unders pass to a hydrocyclone 316 (or a rising current separator or teetered bed), to a first oxygen encapsulated separator 316, and to a second oxygen encapsulated separator 318. The overs pass from the wet screen pass to or are conveyed to a first rising current separator 320 operating at about 2.0 SG, a second rising current separator 324 operating at about 3.2 SG, and/or a third rising current separator 322 operating at about 2.0 SG. The overs/heavies then pass to a magnetic separator 326 capable of recovering ferromagnetic metals or paramagnetic metals, and a centrifuge separator 328 (e.g., at 3.2 SG).

In certain embodiments, the materials, particularly when ball milled using greater than about 35 mesh (e.g., 80 or 100 mesh), may be processed directly to an oxygen encapsulated separator, and the concentrate can be sent to a cleaning table for further concentration, and that recovered concentration can be sent to a smelter or refinery (e.g., illustrated as 116). This again can be accomplished through polar separation or oxygen encapsulated separation or interfacial separation. The precious concentrate, which may contain, for example, silver, gold, and platinum is removed from the system 100 (potentially for further processing). The tails portion is transferred to an oxygen encapsulated separator, a smelter, a centrifuge, or a water table (collectively illustrated as 118), which separate the tails portion into a concentrate, such as a copper concentrate, and ash. The concentrate and ash may undergo further processing. The use of a ball milling type size reducer can allow for more direct processing.

Metals or precious metal particles found in the incinerator ash typically have a flat shape. As such, even though these metals may have relatively high densities, the shape of the particles reduces the settling velocity of these particles. The hindered settling conditions within the rising current classifier also contribute to this reduced settling velocity. As a consequence, these particles have a settling velocity less than that of the rising current of water, resulting in the particles being carried upward in the rising current classifier. The rising water carries these particles over a weir where they are collected separately from the particles of the incinerator ash that have a settling velocity greater than the water current velocity. The velocity of the rising current can be adjusted to maximize the separation of desired constituents, such as precious metals. The rising current classifier may work in a continuous, rather than batch, mode. The thickened material can then be processed at a filter press to produce a cake, which has commercial value.

Certain embodiments can be useful in recovering high value recyclables are present in very low concentrations in incinerator ash. In one embodiment, the incinerator ash may include at least one type of recoverable metal or material at a concentration less than 10%, less than 5%, or even less than 1%, and the system or method can be used to recover at least 50%, at least 70%, at least 80%, or at least 90% of the particular recoverable material or metal.

Although specific embodiments of the disclosure have been described above in detail, the description is merely for purposes of illustration. It should be appreciated, therefore, that many aspects of the disclosure were described above by way of example only and are not intended as required or essential elements of the disclosure unless explicitly stated otherwise. Various modifications of, and equivalent steps corresponding to, the disclosed aspects of the exemplary embodiments, in addition to those described above, can be made by a person of ordinary skill in the art, having the benefit of this disclosure, without departing from the spirit and scope of the invention defined in the following claims, the scope of which is to be accorded the broadest interpretation so as to encompass such modifications and equivalent structures.

What is claimed is:

1. A method for separating combined incinerator ash using water comprising: sizing the incinerator combined ash using at least one 2-stage screen to recover a first material less than about 2 mm; wet screening the first material with a screen, using water slurry, to recover a first group of the combined incinerator ash in the range of about 0.5 mm and about 2 mm and a second group of combined incinerator ash less than about 0.5 mm; processing the first group by (a) separating the first group using a first rising current separator operating at about at 2.0 SG into a first heavy fraction and a first light fraction; (b) separating the first heavy fraction using a second rising current separator operating at about 3.2 SG into a second heavy fraction portion and a second light fraction, wherein the second light fraction contains sand; (c) separating the first light fraction from separator using a third rising current separator or spiral separator operating at about 2.0 SG into a third heavy fraction and third light fraction, wherein the third heavy fraction is conveyed to the second rising current separator for separation; (d) magnetically separating the second heavy fraction to recover ferromagnetic metals and paramagnetic metals; (e) centrifuging at 3.2 SG the second heavy fraction to recover precious metals and heavy metal concentrate; processing the second group by (a) separating the second group using a gravity separator into a first heavy material and first light material, wherein the second light material is removed from the system; (b) de-sliming the first heavy material and then using a first oxygen encapsulated separator to recover a precious metals concentrate and a tail portion containing a copper concentrate, (c) processing the tail portion of first oxygen encapsulated separator through a second oxygen encapsulated separator to recover the copper concentrate, wherein the copper concentrate is a smelter grade copper product.

2. The method of claim 1, further comprising using a second oxygen encapsulated separator to recover copper.

3. The method of claim 1, wherein the first oxygen encapsulated separator includes using dithiphosphates or xanthate.

4. The method of claim 1, wherein the lights portion of rising current separator is waste.

5. The method of claim 1, further comprising reducing the size of the incinerator combined ash using a size reducer.

6. The method of claim 1, further comprising removing materials greater than 2 mm.

7. The method of claim 1, further comprising magnetically separating iron from the separated tails portion using multiple magnets, wherein the magnets include a higher intensity magnet and a lower intensity magnet.

8. The method of claim 1, wherein ratio of centripetal force to fluid is low.

9. The method as claimed in claim 1, wherein the combined incinerator ash is incinerator combined ash.

10. The method as claimed in claim 1, wherein the combined incinerator ash is discretely sized.

11. The method as claimed in claim 1, wherein the metal content of the combined incinerator ash is greater than 4% and the metal content of the aggregate is less than 0.1%.

12. A system for separating incinerator ash materials comprising a size reducer, a 2-stage screen that allows incinerator ash materials of about 50 millimeters (mm) or less to pass through a first screen and allows materials about 2 mm or less to pass through a second screen, a wet screen with water, a hydrocyclone operatively connected to a first oxygen encapsulated separator and a second oxygen encapsulated separator, a first rising current separator operating at about 2.0 SG operatively connected to a second rising current separator operating at about 3.2 SG and a third rising current separator operating at about 2.0 SG, a magnetic separator capable of recovering ferromagnetic metals or paramagnetic metals and operatively connected to the second rising current separator, and a centrifuge separator at 3.2 SG operatively connected to the magnetic separator.

13. The system as claimed in claim 12, wherein the size reducer is selected from the group consisting of a ball mill, a crusher, and shredder.

14. The system as claimed in claim 12, further comprising a de-slimer.

15. The system as claimed in claim 12, further comprising a creep feeder.

16. The system as claimed in claim 12, further comprising a high intensity magnet.

17. The system as claimed with claim 12, wherein the system is configured to process incinerator combined ash.

* * * * *